United States Patent

[11] 3,596,211

[72] Inventors Fleming Dias
Chicago;
Adrian J. De Vries, Elmhurst, both of, Ill.
[21] Appl. No. 680,654
[22] Filed Nov. 6, 1967
[45] Patented July 27, 1971
[73] Assignee Zenith Radio Corporation
Chicago, Ill.

[54] SURFACE-WAVE FILTER REFLECTION CANCELLATION
10 Claims, 4 Drawing Figs.

[52] U.S. Cl. .......... 333/72, 310/9.7, 310/8.3
[51] Int. Cl. .......... H03h 9/00
[50] Field of Search .......... 333/30, 72; 310/8, 9

[56] References Cited

UNITED STATES PATENTS

| | | | |
|---|---|---|---|
| 3,446,974 | 5/1969 | Seiwatz | 250/211 |
| 3,174,120 | 3/1965 | Brouneis | 333/30 |
| 3,283,264 | 11/1966 | Papadakis | 333/72 |
| 3,300,739 | 1/1967 | Mortley | 333/72 |
| 3,376,572 | 4/1968 | Mayo | 343/17.2 |
| 3,360,749 | 12/1967 | Sittig | 333/30 |
| 3,401,360 | 9/1968 | Schulz-Dubois | 333/30 |
| 3,289,114 | 11/1966 | Rowen | 333/30 |

OTHER REFERENCES

C. Tseng " Elastic Surface Waves" Journal of Applied Physics Vol. 38 Oct. 1967 p. 4281— 83

*Primary Examiner*—Herman Karl Saalbach
*Assistant Examiner*—C. Baraff
*Attorney*—John J. Pederson

ABSTRACT: Undesired time-delayed and reduced-amplitude output signal components or "ghosts," due to reflected surface waves arriving at the output transducer of an acoustoelectric surface-wave filter, are inhibited or cancelled by providing an additional transducer suitably located to reflect compensating surface waves which arrive at either the input transducer or the output transducer in appropriate amplitude and phase to nullify the effect of the undesired surface waves. The amplitude of the compensating surface waves is controlled by the configuration of the additional transducer and the magnitude of its associated external load impedance.

Inventors
Fleming Dias
Adrian J. De Vries
By John J. Pederson
Attorney

SURFACE-WAVE FILTER REFLECTION CANCELLATION

BACKGROUND OF THE INVENTION

This invention pertains to solid-state circuitry.

It is now known that an electrode array composed of a pair of interleaved combs of conductive teeth at alternating potentials, when coupled to a piezoelectric medium, produces acoustic surface waves on the medium. In the simplified embodiment of a ceramic wafer polarized perpendicularly to the propagating surface, the waves travel at right angles to the teeth; in crystalline materials, the waves may travel at an acute angle to the teeth, the particular angle in a given case being a function of the crystallography of the material relative to the configuration of the array.

The surface waves are converted back into electrical signals by a similar array of conductive teeth coupled to the piezoelectric medium and spaced from the input electrode array. In principle, the tooth pattern is analogous to an antenna array. Consequently similar signal selectivity is possible, thereby eliminating the need for the critical or much larger and more cumbersome components normally associated with selective circuitry. Thus, this device, with its small size, is particularly useful in conjunction with solid-state functional integrated circuitry where signal selectivity is desired.

Present acousto-electric signal-translating devices, also known as surface-wave filters, have a finite distance between the output and input transducers. Hence, a finite time is required for an acoustic surface-wave signal to travel along the path from the input transducer to the output transducer. At the output transducer, part of the acoustic wave energy is converted to electrical energy and delivered to the load, part of the acoustic wave energy is transmitted past the transducer, and part of the acoustic wave energy is reflected back along the original path toward the input transducer. This reflected surface wave, which is identical in frequency to the original surface wave but smaller in magnitude, intercepts the input transducer where it is again similarly reflected, further attenuated in amplitude, back along the same path to the output transducer resulting in a diminished replica of the original surface-wave signal at the output transducer. As a result, this diminished replica of the original surface-wave signal arrives at the output transducer later than the original surface wave signal, the time delay being equal to twice the time required for a surface-wave signal to traverse the path from the input transducer to the output transducer.

The effect of these reflected signals due to the spacing between the input and output transducers varies with the amount of time delay. If these units are used, for example, as signal-selective devices in a television intermediate-frequency amplifier the reflected signal components appear as ghosts in the picture and make it highly undesirable if not completely unacceptable for normal viewing.

Known methods for approaching this problem include selecting a value of output load impedance such that the maximum amount of electrical signal is transferred from the output transducer to the load impedance. However, enough acoustic energy remains in the medium to create a first order reflected signal at the output of the device which is too large to be negligible.

Another conventional method used to reduce these reflections is to deposit some surface-wave-attenuating material between the transducers. When a reflected surface wave reaches the output transducer, it has traversed the path between the transducers twice. In addition to being smaller than the original surface wave from which it came, it also has been attenuated twice as much as the original surface wave which has traversed the path only once. Therefore the magnitude of the reflected wave is significantly reduced relative to the original surface wave. This method is necessarily inefficient because of the attenuation of the desired surface wave.

Still another method for approaching this problem is to reduce the time delay, which is directly proportional to the distance between the input transducer and the output transducer, by placing the output transducer in close proximity to the input transducer. However, this approach rapidly reaches a point of diminishing returns because the direct cross-talk becomes larger as the output transducer is positioned closer to the input transducer. That is, with close input-output spacings, the input transducer and the output transducer are coupled inductively and/or capacitively as well as acoustically through the piezoelectric medium, resulting in a loss of signal selectivity at the output of the device.

It is therefore an important object of the invention to devise a new and improved surface wave filter in which the output signal is relatively free from undesired reflected signals.

It is a more specific object of the invention to accomplish this elimination of the effects of the undesired reflected signals without the use of complex external circuits or devices.

SUMMARY OF THE INVENTION

An acousto-electric signal-translating device constructed in accordance with the present invention comprises an acoustic-wave-propagating medium. Coupled to the medium are input transducer means for impressing desired acoustic waves on the medium. OUtput transducer means, spaced from the input transducer means, are coupled to the medium and are responsive to the desired acoustic waves for developing an electrical output signal. The device is subject to the generation of undesired acoustic surface waves in the medium and to the consequent development of undesired output signal components by the output transducer means in response to the undesired acoustic surface waves. Additional transducer means, spaced from the input and output transducer means, are coupled to the medium and are responsive to acoustic waves therein for generating additional acoustic waves in the medium to at least partially counteract the undesired acoustic waves and thereby inhibit the development of the undesired output signal components.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENTS

Figure 1:
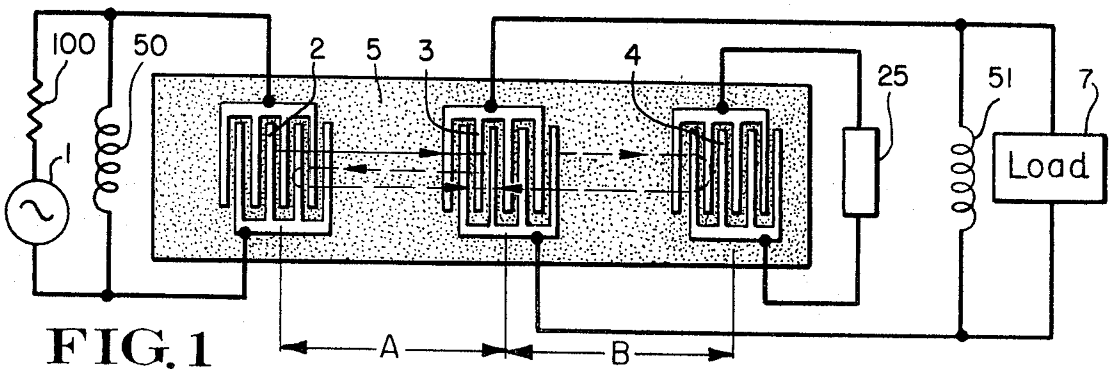
FIG. 1 is a partly schematic plan view of an acousto-electric signal-translating device constituting a preferred embodiment of the invention.

With reference to FIG. 1, an input signal source 1 of suitable internal impedance 100 is connected across an input electrode array 2 which is mechanically coupled to a piezoelectric acoustic-wave-propagating medium 5 to constitute therewith an input transducer. An output electrode array 3 is also mechanically coupled to the acoustic-wave-propagating medium to constitute therewith an output transducer. Electrode arrays 2 and 3 are each constructed of two interleaved comb-type electrodes of a conductive material such as gold, and are vacuum deposited on the plane surface of medium 5 which is a lapped and polished piezoelectric material such as a lead zirconate titanate (PZT) ceramic or a quartz crystal. Maximum amplitude response is achieved for an input signal of such frequency that its wavelength for surface waves in the material of which medium 5 is composed is twice the distance between the centers of two adjacent teeth in the input electrode array 2. (For a 40 MHz television intermediate-frequency application using a PZT substrate, this distance is in the order of 0.001 inch.) Output electrode array 3 is identical in size and configuration to input electrode array 2 and is electrically connected to a suitable output load impedance 7. As shown in FIG. 1, small coils 50 and 51 (two or three turns in the case of a television intermediate-frequency application using PZT) are preferably connected in parallel with electrode arrays 2 and 3 respectively, to tune out the clamped capacity of their associated transducers. Tuning out the clamped capacitance of a transducer increases its efficiency by making the impedance of the parallel combination of the coil and transducer resistive at the center frequency of the device. It should be pointed out that the stability and Q requirements of these coils are not stringent and their effect on the response of the device is minor; accordingly, these coils may be omitted in many practical applications of the invention.

In operation, direct piezoelectric surface-wave transduction is accomplished by the input transducer comprising the spatially periodic electrodes 2. Periodic electric fields are produced along the comb array when a signal from signal source 1 is applied to the electrodes. These fields cause perturbations or deformations of the surface of medium 5 by piezoelectric action. Efficient generation of surface waves occurs when the strain components produced by the electric fields in the piezoelectric substrate 5 substantially match the strain components associated with the surface-wave mode. The mechanical perturbations travel along the surface as Rayleigh waves representative of the input signal. Signal source 1, for example the intermediate-frequency output circuit of the converter of a superheterodyne television receiver, produces a range of signal frequencies, but due to the selective nature of the arrangement, only a signal of a particular frequency and its intelligence-carrying sidebands are converted to surface waves.

The potential impressed between the interleaved comb electrodes produces two surface waves traveling along the surface of medium 5 in opposite directions away from the teeth. The surface wave propagated along medium 5 to the right in FIG. 1 couples to the output transducer and is converted to an electrical output signal for application to load 7. The surface wave traveling to the left of input electrode array 2 intercepts the end of the medium. The effects produced by the acoustic energy reflected at the ends of medium 5 may be minimized by providing acoustic absorbers (not shown) on the ends of medium 5, or by serrating the ends to disperse any such reflected surface-wave energy.

However, as mentioned previously, in the conventional surface-wave filter as thus far described, not all of the acoustic energy arriving at a transducer is converted to electrical energy. Part of the acoustic energy is reflected back along the original path. A surface-wave acoustic filter is analogous to a transmission line, and the reflected wave in the filter can be compared to the reflected wave caused by a discontinuity in a transmission line. Moreover, each time a wave is reflected, it undergoes a phase reversal; that is, its phase is shifted 180°. The term "phase" as used here refers to electrical (time) phase independently of direction (space phase).

When the surface wave traveling to the right of the input transducer intercepts the output electrode array 3, a reflected surface wave is created. This reduced-amplitude reflected surface wave travels along the medium 5 until it intercepts the input electrode array 2 where it is again similarly reflected, in further attenuated form, back along the medium towards the output transducer. Thus a diminished replica of the original surface wave, which has undergone two phase reversals, arrives at the output transducer later than the original surface wave arrives at the output transducer, the time delay being equal to twice the amount of time required for a surface wave to traverse the path from the input transducer along the medium 5 to the output transducer. This diminished replica is the villain that, if not dealt with, produces the aforementioned "ghosts."

It should be noted here that just as a transmission line may be terminated with an impedance such that reflected signals are generated at this terminating impedance which cancel reflected waves generated by an intermediate impedance across the line, one may terminate the surface-wave filter such that reflected surface waves are generated at this termination which substantially cancel the reflected surface waves generated at the output. From a practical standpoint, however, this technique is not as easy as it may seem. Whatever method is used to terminate the end of the surface-wave filter, for example slanting the edge of the substrate or depositing a piece of reflecting material at the end, it is necessary to mechanically position the transducer rather precisely with respect to the end. In a television intermediate-frequency amplifier application, the wavelength of the surface waves in the medium is in the order of 0.002 inch. This means that for a one-fourth wavelength spacing, the transducer must be located with respect to the end of the filter at a distance accurate to 0.0002 inch. Obviously, this is not easily done, especially on a mass production basis. On the other hand, the intertransducer spacing can be accomplished accurately by a somewhat easier photographic method.

Another limitation of the end-termination technique for a surface-wave filter is the resulting narrow bandwidth. The further away the transducer is located from the end of the medium, the greater the number of wavelengths contained in this distance. The increased number of wavelengths produces a shift for a given variation in frequency, resulting in a rather narrow bandwidth. For a television intermediate frequency application, this end-termination method has a narrower bandwidth than the transducer. Consequently, even if the transducer is correctly positioned with respect to the end of the filter, adequate compensating surface waves will not be generated for the entire bandwidth of the transducer and some spurious output signals will not be eliminated.

In accordance with the invention, an additional transducer comprising another identical electrode array 4 mechanically coupled to the acoustic-wave-propagating medium 5 is provided to the right of output transducer 3. A magnitude-establishing load impedance 25 is connected across the additional transducer and is preferably of such magnitude and phase angle as to constitute, with the clamped capacity of the transducer, a resistive load for the additional transducer. This impedance may be a thin-film or thick-film component deposited on the surface of medium 5. Electrode arrays 2, 3, and 4 are aligned on the surface of medium 5. The output transducer is spaced from the input transducer at a predetermined distance, A. Transducer 4, the additional transducer, is spaced from the output transducer 3 at a distance B. Preferably the distances A and B are equal, although B may be greater or smaller than A by an integral multiple of one-half wavelength of the acoustic surface waves in the material.

In FIG. 1, lines with directional arrows have been used to represent the surface waves traveling in the medium 5. However it should be understood that the surface waves actually are composed of wave fronts of a width corresponding to the length of the transducer electrodes, or "teeth." The solid lines represent original or primary surface waves and the dotted lines represent secondary transmitted or reflected surface waves.

With the incorporation of the additional transducer 4 in the surface-wave filter shown in FIG. 1, in accordance with the invention, appropriate compensating surface waves are developed to counteract the effects of the undesired reflected surface waves. When a surface wave arrives at the output transducer 3, a reflected surface wave is propagated back along the path in the medium 5 toward the input transducer 2 just as it is in a conventional surface-wave filter. This undesired reflected surface wave is reflected again when it reaches the input transducer 2. As a result, this wave is reflected twice and therefore undergoes two phase reversals.

However, the transmitted surface wave, which continues on to the right of the output transducer, is no longer simply absorbed or dispersed at the end of the medium. Instead, in accordance with the invention, the additional transducer 4 is located such that it intercepts the transmitted surface wave emanating from the output transducer and reflects a desired compensating surface wave back towards the output transducer. As previously mentioned, the distance between the input transducer 2 and the output transducer 3 is predetermined, and, in accordance with the invention, is preferably made equal to the distance between the additional transducer 4 and the output transducer 3. In reflecting, the compensating surface wave undergoes one phase reversal. Therefore the phase of the compensating wave is shifted 180°. The value of impedance 25 is selected such as to make the magnitude of the compensating surface wave substantially equal to the magnitude of the undesired reflected surface wave. The compensating surface wave is accordingly of opposite polarity and equal magnitude to the undesired reflected surface wave when both waves arrive at the output transducer. It thus produces a corresponding opposite polarity, equal magnitude electrical signal in the output transducer which cancels the spurious electrical signal developed in the output transducer in response to the undesired reflected surface wave. The transmitted surface waves originating from these two waves (the reflected surface wave and the compensating surface wave) continue on past the output transducer and are reflected again. Each time they are reflected they undergo another phase reversal. Therefore, each time these two waves return to the output transducer 3, the electrical signals produced in the transducer are still of opposite polarity and equal magnitude and, as before, cancel each other. If the spacing B differs from spacing A by an integral multiple of one-half wavelength of the acoustic surface waves in the material, the compensating waves developed by additional transducer 4 still arrive at output transducer 3 in phase opposition to the undesired waves to effect partial or total cancellation.

Naturally, this process does not go on indefinitely. Each time a transmitted wave is created by an undesired reflected surface wave or a compensating surface wave, its amplitude is smaller than the amplitude of the wave from which it originated. Its amplitude is further attenuated as it travels through the medium. Consequently, after being reflected a few times, its amplitude is so small that the electrical signals developed in response to it are negligible. Since there are no resulting electrical signals developed in the output transducer in response to the undesired reflected surface waves, the electrical signal delivered to the output load 7 corresponds to the input signal from signal source 1 without any spurious reflected signal components.

Figure 2:
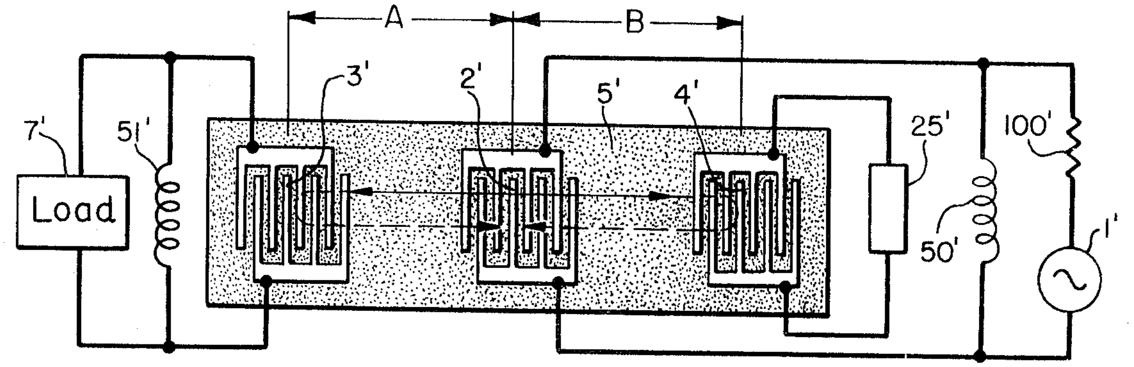
FIG. 2 is a partly schematic plan view of an alternative embodiment of the invention.

FIG. 2 shows a surface-wave filter which has coupled to its medium, in accordance with the invention, an additional transducer 4′ to develop the appropriate compensating surface waves to counteract the effects of the undesired reflected surface waves generated by the filter. Transducers 2′, 3′ and 4′ are aligned on the surface of medium 5′, but the filter shown in FIG. 2 differs from that shown in FIG. 1 in that the input and output transducers are positionally interchanged on the surface of the medium. The additional transducer 4′ is spaced from the input transducer 2′ at a distance equal to the spacing between the input transducer 2′ and the output transducer 3′, or differing therefrom by an integral multiple of one-half wavelength of the acoustic surface wave at the center frequency in the medium.

In operation, an electrical signal from the signal source 1 is impressed on the input transducer 2′ which propagates two surface waves in the medium, one to the left of the input transducer 2′ and one to the right. The surface wave traveling to the left of the input transducer 2′ intercepts the output transducer 3′ where an electrical signal is developed and delivered to the output load 7′. Again an undesirable diminished surface wave is reflected back along the path towards the input transducer 2′. However, the additional transducer 4′, in accordance with the invention, intercepts the surface wave which propagates to the right of the input transducer 2′ and reflects the desired compensating surface wave back towards the input transducer 2′. The value of the magnitude-establishing load impedance 25′ is selected to make the amplitude of the compensating surface wave equal to the amplitude of the undesired reflected surface wave.

In this embodiment, the undesired reflected surface wave and the compensating surface wave must be equal in magnitude and phase in order to produce the desired signal cancellations. This apparent paradox may best be understood in terms of transmission line theory and operation. When a transmission line is terminated with an impedance equal to its characteristic impedance and a signal is transmitted along the line, no reflected signals are created at the terminating impedance. The same result occurs if two such lines are connected in parallel at their terminating ends. In such a configuration the new terminating impedance quite obviously becomes one-half of the original terminating impedance. Therefore when an impedance equal to one-half of the characteristic impedance is connected across a transmission line at some intermediate point and two signals are transmitted along the line, each signal being transmitted such that it arrives at the intermediate impedance having the same phase and amplitude as the other but originating from an opposite end of the line, no reflected signals are created at the impedance. Moreover, no signal is transmitted past the impedance in either direction. Instead, all of the signal energy is dissipated in the impedance. In a similar manner, the undesired reflected surface wave and the compensating surface wave, being of equal magnitude and phase and arriving at the input transducer 2′ from opposite directions, completely dissipate into the transducer leaving no undesired reflected surface waves in the medium to develop any spurious electrical signals in the output transducer. Another way of looking at it is to consider this method of signal cancellation as the reverse of the phenomenon that occurs when an electrical potential is applied to a transducer. In such a case, one electrical potential produces two surface waves in the medium which have equal phase and magnitude but opposite directions; all of the electrical energy is converted to acoustical energy. Hence, to reverse this process and obtain a complete conversion of the acoustical energy to electrical energy, one must provide two surface waves of equal magnitude and phase which intercept the transducer from opposite directions. The resulting electrical energy is dissipated in the source.

Figures 3, 4:
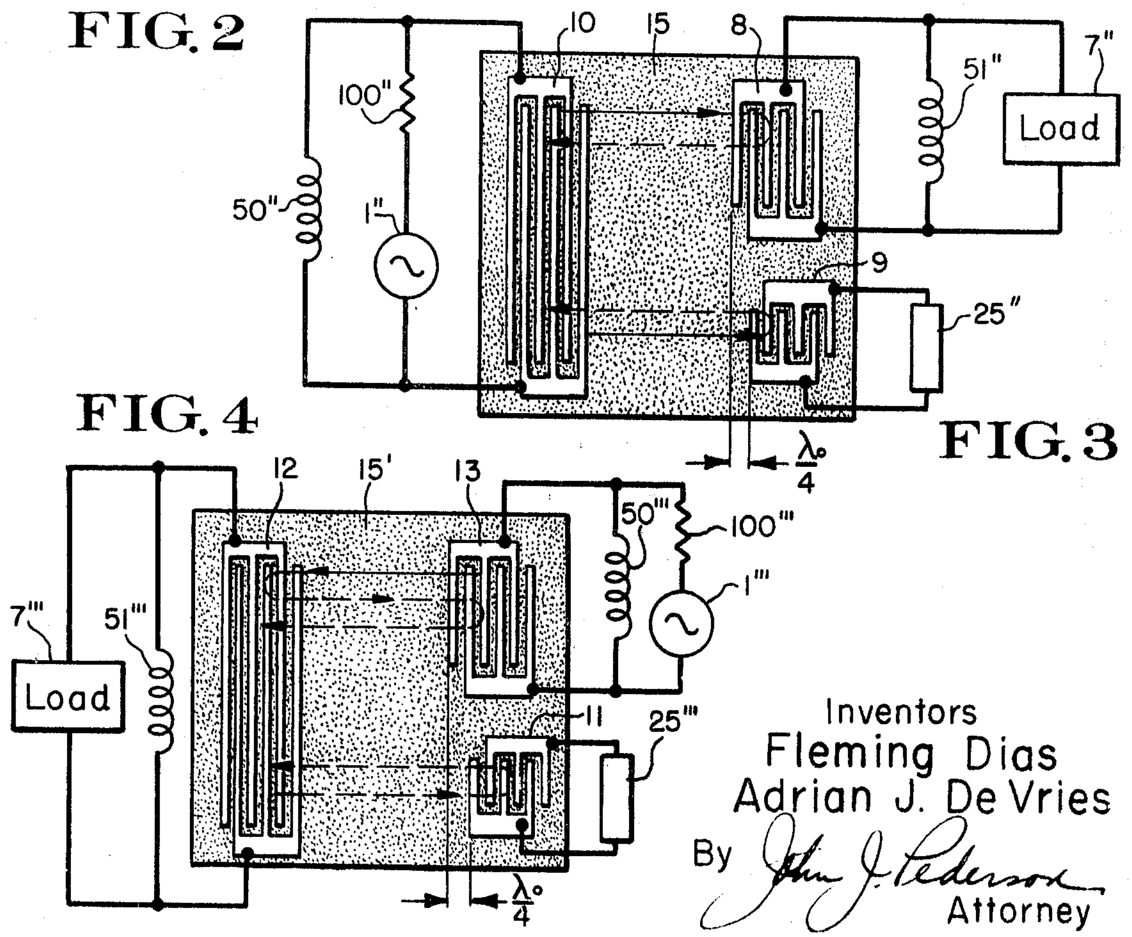
FIG. 3 is a partly schematic plan view of a different embodiment of the invention.
FIG. 4 is a similar view of still another embodiment of the invention.

FIG. 3 depicts another surface-wave filter which utilizes, in accordance with the invention, an additional transducer 9 which is coupled to the medium 15 at a unique location. The sizes and spatial relationships of the transducers in this embodiment are different from the previous surface-wave filters. Here, the length, as measured in a direction transverse to the direction of wave propagation, of the input transducer 10 is greater than the combined lengths of the output and additional transducers 8 and 9 respectively. For maximum efficiency the output transducer should be as long as the input transducer. Therefore, it is best to make the additional transducer as short as possible while still providing additional reflected or compensating surface waves large enough in power to counteract the undesired reflected surface waves produced by the output transducer. The transducer spacings are also unique as in the previous embodiments but in this case, in accordance with the invention, the output transducer 8 is spaced from the input transducer 10 at a predetermined distance which differs from the spacing between the input transducer 10 and the additional transducer 9 by an odd multiple of one-fourth wavelength of the acoustic surface waves at the center frequency of the device. An electrical signal source 1″, with its corresponding internal impedance 100″, is connected to input transducer 10. An output load impedance 7″ is connected to the output transducer 8, and a magnitude-establishing load impedance 25″ is connected to additional transducer 9.

In operation, an electrical signal from signal source 1'' is impressed on the input transducer 10 which creates two surface waves in the medium 15 in opposite directions away from the input transducer. The surface wave traveling to the left of the input transducer 10 is dispersed or absorbed at the edge of the medium 15, depending on the construction of the edge. Most of the surface wave (keeping in mind that the wave fronts are of a width corresponding to the length of the input transducer) traveling to the right of input transducer 10 intercepts the output transducer 8 where part of the surface-wave signal is converted to an electrical signal and delivered to the load 7'', part is transmitted past the transducer, and part is reflected back to the input transducer. However, a small portion of this original surface-wave signal intercepts the additional transducer 9 whereupon a compensating surface wave is reflected back toward the input transducer.

Two opposite phase, equal power surface waves traveling in the same direction and intercepting the same transducer produce opposite polarity, equal magnitude electrical signals in the transducer which cancel each other. This electrical signal cancellation allows the two surface waves to intercept the transducer without creating any reflected surface waves. In the illustrated embodiment, the one-half wavelength (or odd multiple thereof) differential distance that the surface wave travels in going from the input transducer 10 to the additional transducer 9 and back to the input transducer 10 creates the 180° phase shift necessary for the desired signal cancellation and consequent reflection elimination. Again impedance 25'' is chosen for maximum cancellation. In this embodiment, the elimination of the effects of the undesired reflected surface waves materializes in the form of eliminating the secondary reflection of the undesired reflected surface waves which occurs at the input transducer, thereby effectively preventing these undesired surface waves from reaching the output transducer and developing spurious electrical signals therein.

Another embodiment of the invention is shown in FIG. 4. An additional transducer 11 is coupled to the piezoelectric medium 15' at a unique location to produce the desired compensating surface waves. An output transducer 12 and an input transducer 13 are both mechanically coupled to the medium. The length of the output transducer 12 is greater than the combined lengths of the additional transducer 11 and the input transducer 13. For greatest efficiency, the input transducer should be as long as possible and still leave enough room for the additional transducer 11 to function effectively. Input transducer 13 is spaced from output transducer 12 at a distance which differs from the spacing between the output transducer 12 and the additional transducer 11 by a distance equal to an odd multiple of one-fourth wavelength of the acoustic surface waves at the center frequency of the device. Thus, two generally parallel paths are formed in which the surface waves propagate. Again an electrical input signal source 1''', with its associated internal impedance 100''', is connected to the input transducer. An output load impedance 7''' is connected to the output transducer and a magnitude-establishing load impedance 25''' is connected to the additional transducer.

The filter shown in FIG. 4 also operates in such a manner as to internally generate compensating surface waves which effectively cancel the undesirable reflected surface waves inherent in the device. An electrical signal from signal source 1''' applied to the input transducer creates two surface waves in the medium 15' in opposite directions away from the input transducer. The surface wave traveling to the right of the input transducer intercepts the edge where it is dispersed or absorbed, depending on the construction of the edge. The surface wave traveling to the left of the input transducer 13 intercepts the output transducer 12 where an electrical signal is developed and delivered to the load 7'''. A reflected surface wave is thereby created which propagates in further attenuated form, back towards the input transducer. The wave front of a surface wave is of a width corresponding to the entire length of the transducer where it originates, so one part of the reflected surface wave intercepts the input transducer and the other part intercepts the additional transducer. Each part thereupon undergoes a second reflection at its associated transducer and returns with diminished amplitude to the output transducer. Again, these surface waves are traveling in the same direction so the one-fourth wavelength (or odd multiple thereof) differential distance of the path between the output transducer and the additional transducer makes the reflected surface wave in this path 180° out of phase with the other reflected surface wave in the parallel path between the output transducer and the input transducer when the two reflected surface waves arrive at the output transducer. Once more, the value of the magnitude-establishing load impedance is selected to equalize the powers of these two reflected waves. The electrical signals developed in the output transducer in response to these two surface waves are accordingly of opposite phase and equal magnitude and therefore cancel each other. Furthermore, as in the previous embodiment, no additional reflected surface waves are created at the output transducer under these conditions. Thus, with the spurious electrical signals which develop in response to the undesired reflected surface waves, effectively cancelled at the output transducer by the counterphased electrical signals developed therein in response to the internally generated compensating surface waves, the electrical output signal transmitted to the load corresponds to the input signal without any extraneous signal components.

To provide greater design freedom, the magnitude-establishing load impedance utilized in conjunction with the present invention may be a partly reactive component instead of a purely resistive component. For example, omitting the small coils described in the embodiment in FIG. 1 makes a transducer partially capacitive. In such a case, it introduces a phase shift into the compensating reflected wave which is dependent upon the value of the phase angle of the impedance of the transducer. To compensate for this additional phase shift, the spacing of the transducers may be altered accordingly. That is, when the combination is made capacitive instead of purely resistive, the length of the path that the reflected wave travels should be reduced to equalize the phase. A similar argument applies to the other transducers when the phase angle of the combination of the transducer and its associated circuitry is altered.

While optimum inhibition or cancellation of undesired "ghosts" requires that the intertransducer spacings and terminating impedances be proportioned to provide total cancellation of the undesired signal components by the additionally developed reflected waves, there are of course many practical applications in which less than total cancellation is required. For example, in applying the invention to the intermediate-frequency amplifier of a television receiver, reduction of the signal level of the reflected-wave output signal components to a level 30 decibels below the level of the desired or primary output signal components at the output transducer is sufficient to eliminate undesirable "ghosts" from the reproduced image. In such applications, therefore, the additional transducer and its associated external impedance may be designed to provide less than complete signal cancellation for the sake of achieving reduced manufacturing costs and/or to permit greater flexibility in overall filter design.

Another feature of the invention which permits a large degree of design freedom is the manner in which the desired phase shift is brought about. If one does not wish to take advantage of the unique spacing concept described above, then one may still obtain the highly desirable results of this invention by spacing the additional transducer at any desired distance and effectively accomplishing the required phase shift by selectively proportioning the velocities of the respective surface waves, as for example by the use of different materials for different portions of the substrate or by the provision of surface damping layers of appropriate composition and thickness.

Thus the invention provides a new and improved solid-state surface-wave filter which has substantial advantages over predecessor devices. It provides simply and efficiently for the elimination of the effects of undesired reflected signals inherent in previous acousto-electric signal-translating devices. The entire physical structure can be constructed of such small size as to be particularly useful in conjunction with solid-state integrated circuitry.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An acousto-electric surface-wave signal-translating device comprising:

a solid-state acoustic-surface-wave-propagating medium;

an input surface-wave transducer coupled to said wave-propagating medium at a first location and responsive to an input signal of a predetermined center frequency for propagating a first acoustic-surface-wave signal along a predetermined path in said medium;

an output surface-wave transducer coupled to said medium at a second location on said predetermined path and spaced from said first location by a predetermined distance along said path, said output transducer being responsive to said first acoustic-surface-wave signal to develop a desired electrical output signal but also initiating a second acoustic-surface-wave signal comprising a reduced-amplitude reflection of said first acoustic-surface-wave signal and said output transducer being subject to generate a spurious output signal component attributed to said reflection;

means including an additional surface-wave transducer coupled to said medium at a location spaced from said first and second locations and responsive to one of said acoustic-surface-wave signals in said medium to propagate a compensating acoustic-surface-wave signal along a path traversing one of said input and output transducers, said compensating acoustic-surface-wave signal being substantially in counterphase with said second acoustic-surface-wave signal at said one transducer;

and means including a load impedance coupled to said additional transducer for establishing the amplitude of said compensating acoustic-surface-wave signal at said one transducer at a level effectively equal to the amplitude of said second acoustic-surface-wave signal at said one transducer, whereby said spurious output signal component is effectively eliminated.

2. An acousto-electric signal-translating device according to claim 1, in which said one transducer is said output transducer and elimination of said spurious output component is accomplished by the generation of a cancelling signal component by said output transducer in response to said acoustic-surface-wave signal.

3. An acousto-electric signal-translating device according to claim 1, in which said one transducer is said output transducer and the electrical signals attributable to said second signal and to said compensating signal are mutually cancelling at said input transducer so that no reflected acoustic-surface-wave reaches said output transducer.

4. An acousto-electric signal-translating device according to claim 1, in which said acoustic-surface-wave propagating medium is composed of piezoelectric material and each of said transducers comprises a pair of surface electrodes on said medium.

5. An acousto-electric signal-translating device according to claim 4, in which the surface electrodes of each pair are in the form of interleaved combs of conductive material on a common surface of said medium, with the space between adjacent teeth in each comb being substantially one wavelength at said predetermined frequency.

6. An acousto-electric signal-translating device according to claim 1, in which the spacing between said additional transducer and said one transducer differs from the spacing between said input and output transducers by substantially an odd multiple of one-fourth wavelength at said predetermined center frequency.

7. An acousto-electric signal-translating device according to claim 1, in which said load impedance coupled to said additional transducer make the characteristics of said additional transducer and said load impedance substantially resistive.

8. An acousto-electric surface wave signal-translating device comprising:

an acoustic-surface-wave-propagating medium;

input surface-wave transducer means coupled to said medium for impressing desired acoustic surface waves on said medium and propagating them along a pair of generally parallel wave-propagating paths;

output surface-wave transducer means spaced from said input transducer means, coupled to said medium at one of said paths and responsive to said desired acoustic surface waves for developing an electrical output signal;

said device being subject to the generation of undesired acoustic surface waves in said medium and to the consequent development of undesired output signal components by said output transducer means in response to said undesired acoustic surface waves;

and additional surface-wave transducer means spaced from said input and output transducer means, coupled to said medium at the other of said paths at a location traversed by said desired acoustic surface waves, and responsive to acoustic surface waves therein for generating additional acoustic surface waves in said medium substantially in counterphase with said undesired acoustic surface waves at one of said transducers to substantially counteract said undesired acoustic surface waves and thereby inhibit the development of said undesired output signal components.

9. An acousto-electric surface wave signal-translating device comprising:

an acoustic-surface-wave-propagating medium;

input surface-wave transducer means coupled to said medium for impressing desired acoustic surface waves on said medium and propagating them along a first predetermined path;

output surface-wave transducer means spaced from said input transducer means, coupled to said medium in said path and responsive to said desired acoustic surface waves for developing an electrical output signal;

said device being subject to the generation of undesired acoustic surface waves in said medium by said output transducer means, coupled to said medium in said path and responsive to said desired acoustic surface waves for developing an electrical output signal;

said device being subject to the generation of undesired acoustic surface waves in said medium by said output transducer means and their propagation concurrently therefrom along two spaced paths in said medium extending to said input transducer means and to said additional transducer means, respectively, and to the consequent development of undesired output signal components by said output transducer means in response to said undesired acoustic surface waves;

and additional surface-wave transducer means spaced from said input and output transducer means, coupled to said medium at a location traversed by said desired acoustic waves, and responsive to acoustic surface waves therein for generating additional acoustic surface waves in said medium substantially in counterphase with said undesired acoustic surface waves at one of said transducers to substantially counteract said undesired acoustic surface waves and thereby inhibit the development of said undesired output signal components.

10. An acousto-electric surface wave signal-translating device comprising:

an acoustic-surface-wave-propagating medium;

input surface-wave transducer means coupled to said medium for impressing desired acoustic surface waves on said medium;

output surface-wave transducer means spaced from said input transducer means, coupled to said medium and responsive to said desired acoustic surface waves for developing an electrical output signal;

said device being subject to the generation of undesired acoustic surface waves in said medium and to the consequent development of undesired output signal components by said output transducer means in response to said undesired acoustic surface waves;

and additional surface-wave transducer means spaced from said input and output transducer means, coupled to said medium at a location traversed by said desired acoustic surface waves, and responsive to acoustic surface waves therein for generating additional acoustic surface waves in said medium substantially in counterphase with said undesired acoustic surface waves at one of said transducers, and further including a load impedance coupled to said additional transducer means for establishing the amplitude and phase of said additional acoustic surface waves to substantially counteract said undesired acoustic surface waves and thereby effectively inhibit the development of said undesired output signal components.